United States Patent [19]

Cahill et al.

[11] Patent Number: 5,020,076
[45] Date of Patent: May 28, 1991

[54] HYBRID MODULATION APPARATUS

[75] Inventors: Stephen V. Cahill, Palatine; Steven F. Gillig, Roselle; Thomas J. Walczak, Palatine, all of Ill.

[73] Assignee: Motorola, Inc., Schaumburg, Ill.

[21] Appl. No.: 526,156

[22] Filed: May 21, 1990

[51] Int. Cl.⁵ .................... H04L 25/00; H04L 27/00
[52] U.S. Cl. .......................... 375/5; 375/56; 332/103
[58] Field of Search .............. 375/5, 44, 45, 39, 52, 375/104, 56; 455/218, 38; 332/100, 117, 125, 103; 379/93, 98; 340/825.44, 825.48

[56] References Cited

U.S. PATENT DOCUMENTS

| | | | |
|---|---|---|---|
| 3,938,155 | 2/1976 | Mears et al. | 375/5 |
| 4,131,849 | 12/1978 | Freeburg et al. | 375/5 |
| 4,229,821 | 10/1980 | de Jager et al. | 375/53 |
| 4,418,416 | 11/1983 | Lese et al. | 379/98 |
| 4,481,489 | 11/1984 | Kurby | 332/19 |
| 4,608,699 | 8/1986 | Batlivala et al. | 375/45 |
| 4,748,685 | 5/1988 | Rozanski, Jr. | 455/218 |

FOREIGN PATENT DOCUMENTS 0170324  5/1984  European Pat. Off. .

OTHER PUBLICATIONS

De Jager and Dekker: Tamed Frequency Modulation in Digital Transmission IEEE Transactions on Communications, vol. COM-26, No. 5, pp. 539-540, May 1978.
Principles of Data Communication, by R. W. Lucky, J. Salz and E. J. Weldon, Jr., McGraw-Hill Book Company, pp. 166-168, 1968.

*Primary Examiner*—Douglas W. Olms
*Assistant Examiner*—Stephen Chin
*Attorney, Agent, or Firm*—Kenneth W. Bolvin

[57] ABSTRACT

A π/4-shift DQPSK modulator modulates a digitized voice signal and other information. An FM modulator modulates the analog voice signal and other information. The FM modulator is coupled to the quadrature mixers (109 and 110) of the π/4-shift DQPSK modulator. When an FM modulated signal is required, the mixers (109 and 110) are biased (114) to allow carrier feedthrough by applying a fixed, non-zero DC signal to one or both mixers (109 and 110). The carrier is then FM modulated using conventional methods such as voltage-modulation of a phase locked loop (PPL) (113). When π/4-shift DQPSK is to be generated, the conventional baseband I and Q vector-length signals (101 and 102) are applied to the mixers (109 and 110), and the carrier is left unmodulated by switching (115) out the input signal to the PLL (113). The PPL (113) will then generate only the carrier frequency to be mixed with the I and Q vector-length signals (101 and 102).

26 Claims, 3 Drawing Sheets 5,020,076

HYBRID MODULATION APPARATUS

FIELD OF THE INVENTION

The present invention relates generally to the field of communications and particularly to carrier modulation.

BACKGROUND OF THE INVENTION

Cellular radiotelephones are a common means of radio communications between mobile users and the landline telephone system. The cellular systems, using analog transmission techniques, are rapidly reaching capacity due to an ever increasing number of users.

Cellular systems using digital transmission techniques that can provide a greater number of telephone calls per channel are presently being developed. The large number of analog cellular users, however, precludes a rapid changeover to the digital cellular systems. Interim cellular systems, therefore, may be combined digital and analog systems. This will allow either an analog-type radiotelephone or a digital-type radiotelephone to use the combined digital and analog systems. If a system is only a digital-type or analog-type, the other type radiotelephone will not work in that system.

One possible solution is a hybrid telephone having both digital and analog transmission circuits. This could be accomplished by combining the $\pi/4$-shift differential quadrature phase shift keying (DQPSK) circuit required to generate the digital-cellular modulation with the frequency modulation (FM) circuit required to generate the voice and signalling modulation required for standard analog cellular. A quadrature modulator such as the DQPSK modulator is disclosed in, Luck, Salz, and Weldon Jr., *Principles of Data Communication* at page 168.

Combining both complete modulation circuits in a radiotelephone would require the radiotelephone to be larger to accommodate both circuits, and cost would be added. In addition, the radiotelephone would need additional power for both circuits. Size, weight, and power consumption must be kept to a minimum, particularly in portable radiotelephones. There is a resulting need for a single hybrid modulation circuit that can provide both analog and digital modulation.

SUMMARY OF THE INVENTION

The present invention is comprised of a first modulator for modulating a digital signal and a second modulator for modulating an analog signal. The second modulator is coupled to the first modulator. The first modulator can be disabled by a control signal allowing a signal from the second modulator to feedthrough the first modulator to the output of the present invention.

A radiotelephone using the present invention can operate in both an analog cellular system and a digital cellular system. A $\pi/4$-shift DQPSK modulator of the present invention modulates a digitized voice signal and other information, allowing the radiotelephone to operate in the digital cellular system. An FM modulator of the present invention modulates the analog voice signal and other information, allowing the radiotelephone to operate in the analog cellular system. The FM modulator is connected to the quadrature mixers of the $\pi/4$-shift DQPSK modulator. When an FM modulated signal is required, the mixers are biased to allow carrier feedthrough by applying a fixed non-zero DC signal to one or both mixers. The carrier can then be FM modulated using conventional methods such as voltage-modulation of the voltage-controlled oscillator (VCO) portion of a PLL. When $\pi/4$-shift DQPSK is to be generated, the conventional baseband I and Q vector-length signals are applied to the mixers, and the carrier is left unmodulated by disabling the modulation input signal to the PLL. The PLL will then generate only the carrier frequency to be mixed with the I and Q vector-length signals.

DETAILED DESCRIPTION OF THE PREFERRED EMBODIMENT

The present invention provides modulation for both digital and analog signals, by combining quadrature modulation circuitry to generate $\pi/4$-shift DQPSK for modulating digital signals in the digital cellular mode, with FM modulation of the VCO in the transmit-IF PLL for modulating analog signals in the analog cellular mode, in one hybrid modulation circuit. When used in a radiotelephone, the present invention provides operation in both digital cellular systems and analog cellular systems.

The $\pi/4$-shift DQPSK modulator of the present invention generates modulation to meet the requirements of Electronic Industries Association (EIA) project PN2215, Interim Standard-54 (IS-54). This standard specifies the compatibility requirements for mobile radiotelephone and base site intercommunications by a digital TDMA channel.

Figure 5:
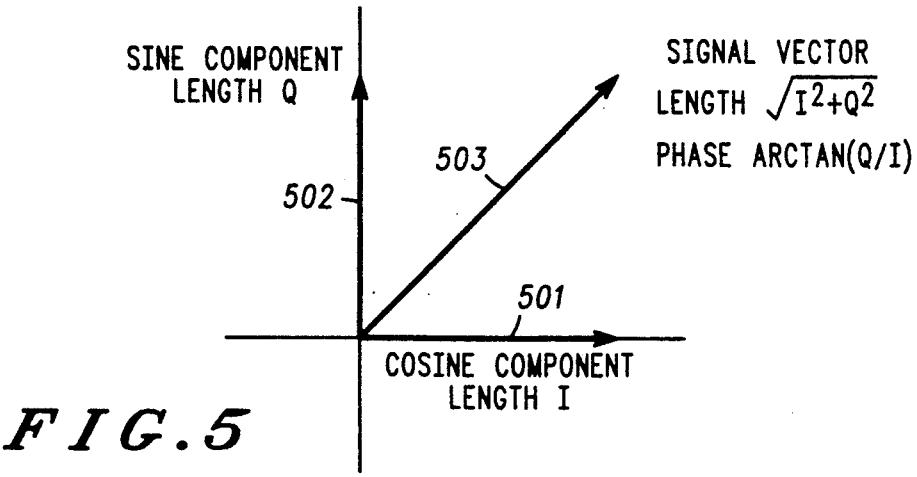
FIG. 5 shows the I and Q vectors used for $\pi/4$-shift DQPSK modulation.

The signal vector (503) representing the $\pi/4$-shift DQPSK modulation of the carrier, as illustrated in FIG. 5, consists of a cosine component (501) and a sine component (502). The signal scaling the amplitude of the cosine component (501) is also known as the in-phase or I signal and the signal scaling the amplitude of the sine component (502) is also known as the quadrature or Q signal. The I and Q-scaled cosine and sine signals are the orthogonal quadrature components (501 and 502) at the transmit-IF frequency; the digital transmission then being created by mixing the orthogonal components (501 and 502) with a signal offset from the final transmit frequency by the transmit-IF frequency and then summing the outputs of the mixing operations.

Symbols representing the filtered vector components I and Q of the phase shift of the signal vector (503) are generated by shifting the signal vector (503) such that phase shifts of the carrier of $\pm\pi/4$ or $\pm 3\pi/4$ radians are generated. Each phase shift encodes one of four possible symbols.

Serial digital data that is eventually to be modulated by the $\pi/4$-shift DQPSK modulator of the present invention is first converted to bit pairs. Each bit pair specifies a symbol that is the desired vector shift relative to the previously transmitted symbol. The mapping of bit pairs to symbol vectors is according to the equations:

$$I(k) = I(k-1) \cos(\Delta\phi(X(k),Y(k))) - Q(k-1) \sin(\Delta\phi(X(k),Y(k)))$$

$$Q(k) = I(k-1) \sin(\Delta\phi(X(k),Y(k))) + Q(k-1) \cos(\Delta\phi(X(k),Y(k)))$$

where k is an index of the bit pairs; k=1 for bits 1 and 2 paired, k=2 for bits 3 and 4 paired, etc. I(k−1) and Q(k−1) are the amplitudes of the cosine and sine components of the previous symbol vector. X(k) represents the first bit of bit pair (k) and Y(k) represents the second bit of bit pair (k). The phase change, $\Delta\phi$, is determined according to the following table:

| X(k) | Y(k) | $\Delta\phi(X(k),Y(k))$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

Thus, one of 4 possible symbols are transmitted for each two bits of the serial data stream.

The reason for the modulation nomenclature $\pi/4$-shift DQPSK and how it works is now evident: the phase shift is in $\pi/4$ increments in vector space, symbols are differentially encoded with respect to the previous symbol vector, and the information bearing quantity in the carrier is the phase-shift with one of 4 possible shifts between any two symbols. The operation of a standard $\pi/4$-shift DQPSK modulator is represented by the equation:

$$V_{out}(t) = (I(t)) \cos(2\pi ft) + (Q(t)) \sin(2\pi ft)$$

where I(t) and Q(t) are I(k) and Q(k) as defined above as a function of time, and f is a transmit-IF. In an alternate embodiment, f is the carrier frequency.

Figure 1:
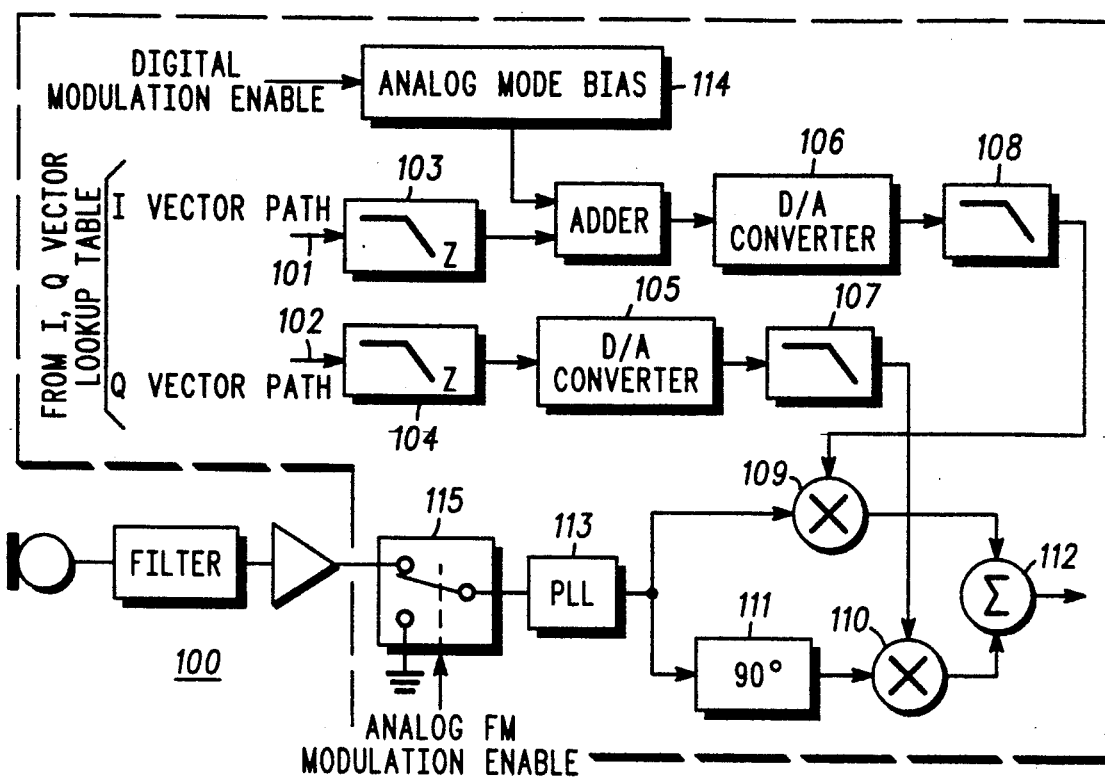
FIG. 1 shows a block diagram of the preferred embodiment of the present invention.

The $\pi/4$-shift DQPSK modulator of the present invention, illustrated in FIG. 1, comprises the I (101) and Q (102) vector sources that produce signals that are digitally lowpass filtered (103 and 104). The filtering is performed due to the desire for spectral efficiency in the digital cellular mode. The baseband vector-length signals I and Q are filtered to bandlimit their spectra. Because the RF carrier is a linear translation in frequency of the filtered baseband signals, it is correspondingly bandlimited.

After the low-pass filtering, the vectors are converted to analog form by a digital to analog converter (105 and 106); then anti-alias filtered (107 and 108) to remove images generated around the digital-to-analog converter (105 and 106) sampling frequency and its harmonics. These vectors (501 and 502), illustrated in FIG. 5, are constantly changing depending on the digital information to be transmitted. The now analog I and Q signals are mixed in the balanced mixer section (109 and 110) with the carrier frequency provided by an oscillator; the I signal is mixed with the oscillator signal and the Q signal is mixed with a 90° shifted (111) oscillator signal. The resulting signals from these two operations are then added at the summer (112) to produce the modulated signal that is nominally centered at the carrier frequency.

The oscillator of the present invention is the VCO portion of a PLL (113) that also provides a transmit-IF signal at 90 MHz for frequency modulation when the present invention is in the analog cellular modulation mode. In an alternate embodiment, the modulation can be produced by digital phase modulation. By modulating the PLL with the analog cellular information signal, which may include a voice signal, the PLL will produce an FM signal. The cutoff frequency of the lowpass loop filter in the PLL is set below the lowest frequency of interest in the modulation, as is conventionally done with FM modulation in PLL circuits. Frequency modulation, which is well known in the art, is discussed in F. Stremler, *Introduction to Communication Systems* at Chapter 6 (1982). The FM modulation of the present invention is according to the requirements of EIA IS-19. This standard specifies the compatibility requirements for mobile radiotelephone and base site intercommunications by an analog FM channel.

The operation of the present invention is represented by the equation:

$$V_{out}(t) = I(t) \cos(2\pi ft + \phi(t)) + Q(t) \sin(2\pi ft + \phi(t)).$$

In the digital cellular mode, $\phi(t)$ is set to a constant by removing the analog modulation from the PLL input, and I(t) and Q(t) are applied to the mixer inputs. The generated modulation is then:

$$V_{out}(t) = I(t) \cos(2\pi ft + \beta) + Q(t) \sin(2\pi ft + \beta).$$

The constant $\beta$ is arbitrary, and does not affect operation so long as it remains fixed.

In the analog cellular mode, I(t) and Q(t) are set to constants C and D respectively, and the transmit signal is solely frequency modulated by $\phi(t)$. The generated modulation equation then becomes:

$$V_{out}(t) = (C) \cos(2\pi ft + \phi(t)) + (D) \sin(2\pi ft + \phi(t)).$$

For analog cellular, $\phi(t)$ may be generated from gain-adjusted, filtered, pre-emphasized and integrated microphone audio, as well as integrated supervisory audio frequency (SAT), and integrated 10 kbit/sec Manchester-encoded data, such as is required for analog signalling and control per EIA IS19, applied to a PLL control input along with the normal PLL frequency-steering signal.

In the present invention, the values of constants C and D determine the level applied to linear amplifiers that may follow the summer (112). Transmit-IF signal power level is set by:

$$P = \frac{C^2 + D^2}{Z}$$

where Z is the impedance level where P is measured. The constants chosen can be any values which solve this equation for a particular P. In the preferred implementation, D is nominally 0, and C determines P.

These constants, in traditional implementations of such quadrature modulators, appear as unavoidable DC offsets which cause an undesired carrier term to appear at the output of the modulator. The present invention thus creates a carrier feedthrough term when in the analog cellular mode by deliberately creating an unbalance in one or both of the quadrature modulator mixers. This is done by the application of a DC input to one or both of the normal mixer inputs.

In the preferred embodiment, as illustrated in FIG. 1, the DC offset biasing is performed by adding an offset (114) to the digital signals entering the digital to analog converter (105 or 106) in either or both of the I (101) and Q (102) vector paths. The digital signals I(t) and Q(t) are set to zero and the level of the offsets applied through the vector paths determines the amount of carrier fed through to the transmit sections. Thus, if the DC bias applied to the I-vector path (101) is C, and the DC bias applied to the Q-vector path (102) is 0, the transmit signal becomes:

$$V_{out}(t) = (C) \cos(2\pi ft + \phi(t))$$

Figure 2:
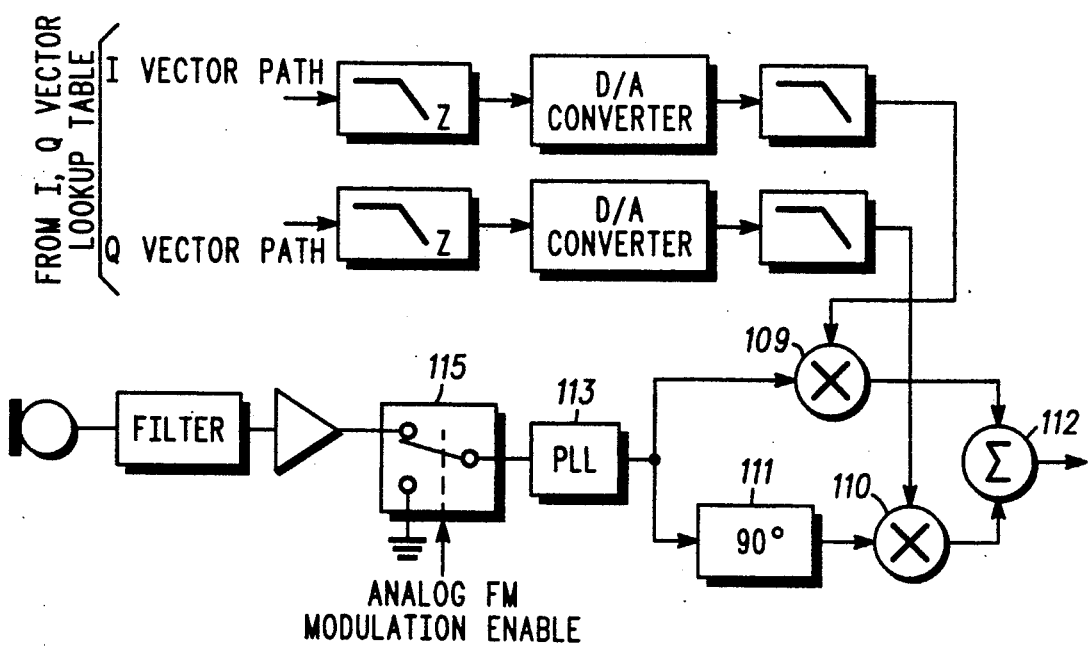
FIG. 2 shows a block diagram of an alternate embodiment of the present invention.
Figure 3:
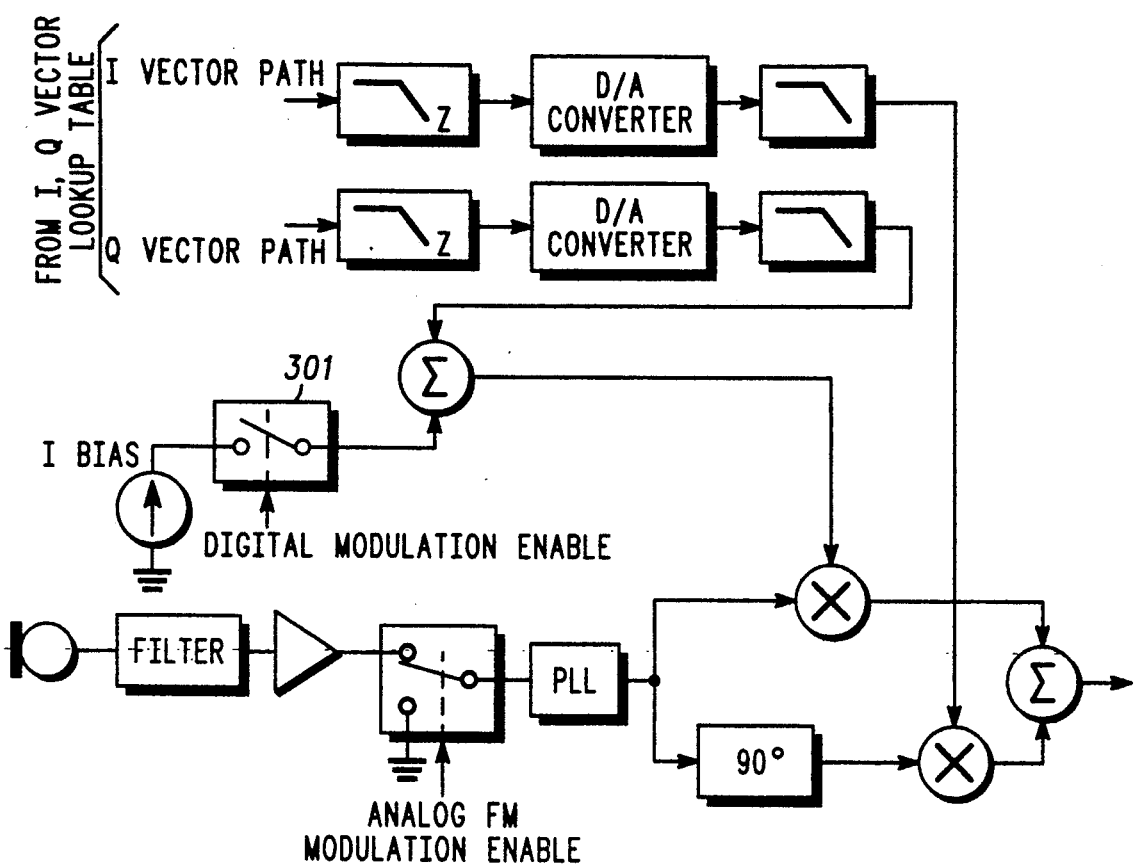
FIG. 3 shows a block diagram of another alternate embodiment of the present invention.

An alternate embodiment of the present invention for biasing the mixers, illustrated in FIG. 2, uses the I and Q vector table with a fixed output. When the vector output is fixed to one of the table entries, so long as each (I,Q) entry pair is chosen such that the quantity $(I^2 + Q^2)$ is the same for each entry, the vector table entry that is used is irrelevant. This is normally the case for $\pi/4$-shift DQPSK where these quantities are a constant times $(\sqrt{2}, 0), (1, 1), (0, \sqrt{2}), (-1, 1), (-\sqrt{2}, 0), (-1, -1), (0, -\sqrt{2})$, and $(1, -1)$ for the absolute vector space phases $0, \pi/4, 2\pi/4, 3\pi/4, \pi, -3\pi/4, -2\pi/4$, and $-\pi/4$ respectively, which are generated from relative phase shifts of $\pm\pi/4$ and $\pm 3\pi/4$, repeatedly applied. Alternatively a ninth vector table entry with a unique desired bias level is applied when in the analog cellular mode. This 9th entry is a value which produces a desirably different power P in the FM mode than in the $\pi/4$-shift DQPSK mode.

Another alternate embodiment of the present invention is an offset current bias (302) switched (301) into one or both mixers between the digital to analog converters and the mixers. This bias can be applied to either I or Q vector paths individually or both simultaneously. This bias causes the mixer or mixers to which it is applied to generate carrier feedthrough according to the equations:

$$V_{out}(t) = (B) \cos(2\pi ft + \phi(t))$$

or $$V_{out}(t) = (B) \sin(2\pi ft + \phi(t))$$

for the mixers fed with PLL and PLL shifted by 90° respectively, where B is the resultant DC bias voltage.

Figure 6:
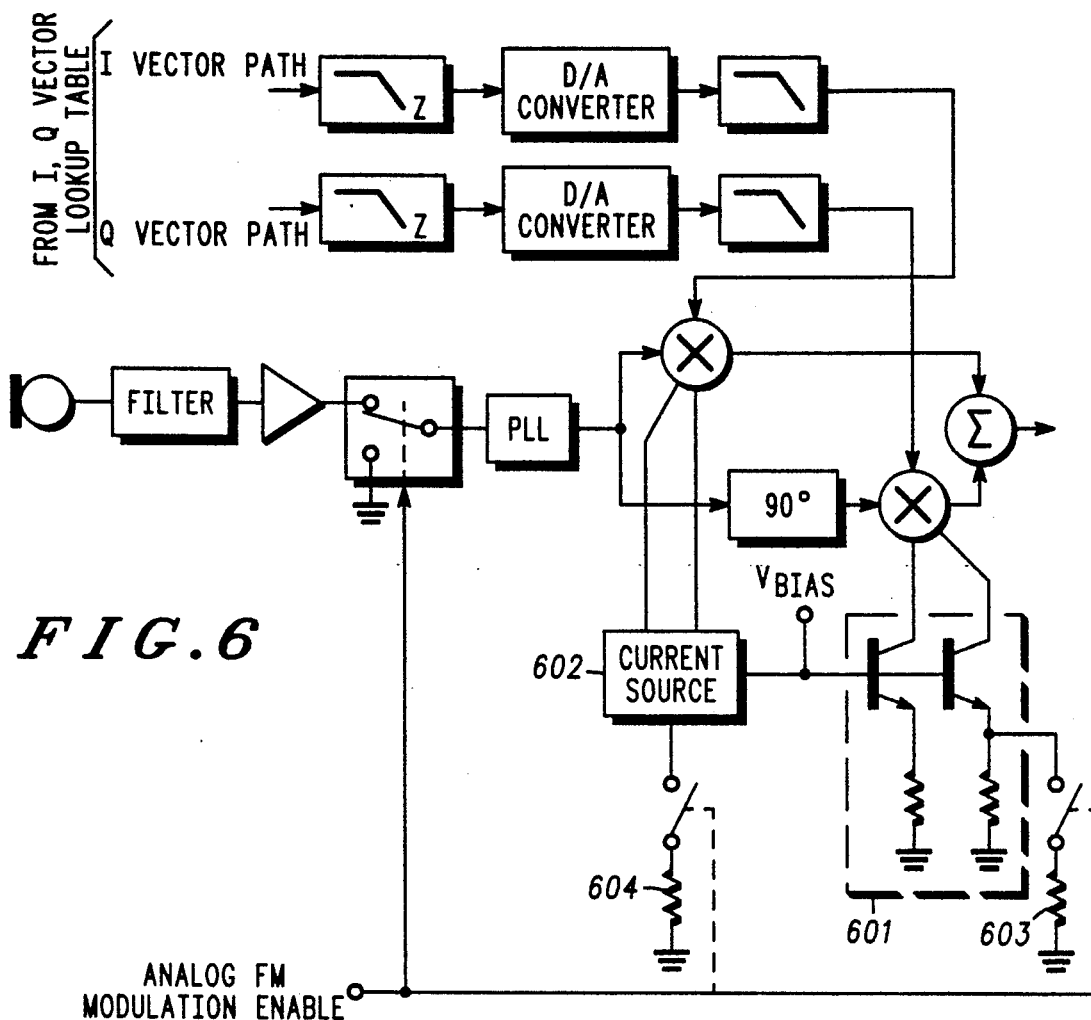
FIG. 6 shows a block diagram of another alternate embodiment of the present invention.

An alternate embodiment of the present invention, illustrated in FIG. 6, consists of creating the desired mixer unbalance by modifying balanced current sources (601 and 602) connected to separate inputs of the mixers. The current sources are made to add an unbalanced current to the mixers by switching in a resistor (603 and 604) to the emitter of one of the current source (601 or 602) transistors.

When the $\pi/4$-shift DQPSK modulator of the present invention is selected, the analog signal modulating the PLL must be disabled in order for the PLL frequency to be multiplied with the I and Q vector signals without phase error introduced by concurrent analog modulation. This is accomplished by switching out the analog PLL modulation signal whenever the $\pi/4$-shift DQPSK is selected. The PLL is then left oscillating at the offset frequency. The $\pi/4$-shift DQPSK or FM modulation, at the 90 MHz offset, is mixed with a frequency in the range of 914.04–938.97 MHz, to generate the transmit signal in the range of 824.04–848.97 MHz.

Figure 4:
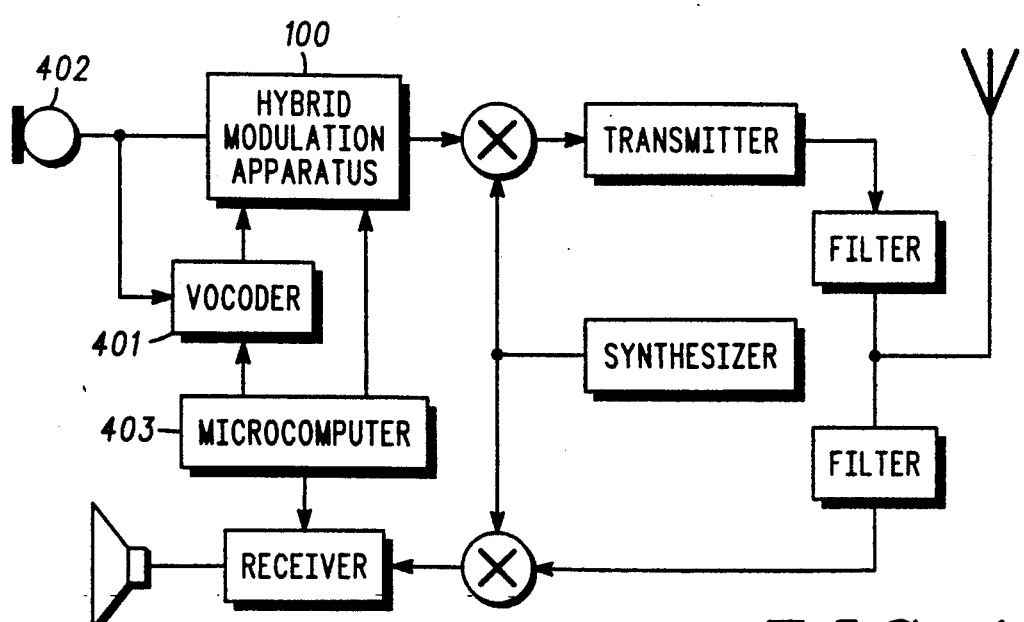
FIG. 4 shows a block diagram of a system using the present invention.

When the present invention is used in a radiotelephone, as illustrated in FIG. 4, the digital data that is to be modulated by the $\pi/4$-shift DQPSK modulator is sourced primarily by the radiotelephone's vocoder (401). The vocoder (401), using a Vector Sum Excited Linear Prediction (VSELP) algorithm, converts analog waveforms generated by the microphone (402) or other analog sources to an 8 kbit/sec. bit stream. VSELP is discussed in the technical description *VSELP 13000 Bit Per Second Voice Coding Algorithm Including Error Control for Digital Cellular*, by Motorola, Inc. (1989).

The switching between analog cellular and digital cellular, in the present invention, is accomplished by the microcomputer (403). This switching can be accomplished by a switch on the radiotelephone or by automatic selection of the modulation type.

In summary, when a radiotelephone using the present invention is located in a digital-type cellular system, the $\pi/4$-shift DQPSK portion of the present invention modulates digitized voice and other information. If the radiotelephone is located in an analog-type cellular system, the FM portion of the present invention modulates the voice and other information. This modulated information, whether from $\pi/4$-shift DQPSK or FM, is then transmitted to the cellular base site for transmission to a landline phone system or to another radiotelephone. The present invention, therefore, provides a radiotelephone with the capability of operating in a dedicated digital-type, a dedicated analog-type, or a hybrid-type cellular radiotelephone system.

We claim:

1. A hybrid modulation apparatus, with a voice signal input, having at least a digital mode and an analog mode, the apparatus comprising:
    (a) differential quadrature phase shift keying (DQPSK) means, coupled to the voice signal, for generating a $\pi/4$-shifted DQPSK signal in the digital mode, the means comprising:
    an I vector source coupled to an I vector path; and
    a Q vector source coupled to a Q vector path;
    (b) first mixing means having a first input, a second input, and an output, the first input coupled to the I vector path;
    (c) second mixing means having a first input, a second input, and an output, the first input coupled to the Q vector path;
    (d) offset oscillator means for generating a frequency modulated signal in the analog mode and a carrier frequency in the digital mode, the means having an output coupled to the second input of the first mixing means, and a modulation input;
    (e) switching means having a first input coupled to the voice signal, a second input coupled to ground potential, and an output coupled to the modulation input of the offset oscillator means, the switching means coupling the voice signal to the offset oscillator means in the analog mode and the ground potential to the offset oscillator means in the digital mode;
    (f) phase shifting means having an input and an output, the input coupled to the output of the offset oscillator means and the output coupled to the second input of the second mixing means;
    (g) control means coupled to the first input of the first mixing means, for enabling the analog mode; and (h) combining means, having an output, for combining the outputs of the first and second mixing means, the combining means output is an output of the hybrid modulation apparatus.

2. The apparatus of claim 1 wherein the control means is a DC offset.

3. The apparatus of claim 1 wherein the control means is an offset current.

4. The apparatus of claim 1 wherein the phase shifting means is a 90° phase shifter.

5. The apparatus of claim 1 wherein the I vector path contains at least one filter and a digital to analog converter.

6. The apparatus of claim 1 wherein the Q vector path contains at least one filter and a digital to analog converter.

7. A hydrid modulation apparatus, with a voice signal input, having at least a digital mode and an analog mode, the apparatus comprising:
 (a) differential quadrature phase shift keying (DQPSK) means, coupled to the voice signal, for generating a π/4-shifted DQPSK signal in the digital mode, the means comprising:
  an I vector source coupled to an I vector path; and
  a Q vector source coupled to a Q vector path;
 (b) first mixing means having a first input, a second input, and an output, the first input coupled to the I vector path;
 (c) second mixing means having a first input, a second input, and an output, the first input coupled to the Q vector path;
 (d) offset oscillator means for generating a frequency modulated signal in the analog mode and a carrier frequency in the digital mode, the means having an output coupled to the second input of the first mixing means, and a modulation input;
 (e) switching means having a first input coupled to the voice signal, a second input coupled to ground potential, and an output coupled to the modulation input of the offset oscillator means, the switching means coupling the voice signal to the offset oscillator means in the analog mode and the ground potential to the offset oscillator means in the digital mode;
 (f) phase shifting means having an output and an input, the input coupled to the output of the offset oscillator means and the output coupled to the second input of the second mixing means;
 (g) control means coupled to the first input of the second mixing means, for enabling the analog mode; and
 (h) combining means, having an output, for combining the outputs of the first and second mixing means, the combining means output is an output of the hybrid modulation apparatus.

8. The apparatus of claim 7 wherein the control means is a DC offset.

9. The apparatus of claim 7 wherein the control means is an offset current.

10. The apparatus of claim 7 wherein the phase shifting means is a 90° phase shifter.

11. The apparatus of claim 7 wherein the I vector path contains at least one filter and a digital to analog converter.

12. The apparatus of claim 7 wherein the Q vector path contains at least one filter and a digital to analog converter.

13. A hybrid modulation apparatus, with a voice signal input, having at least a digital mode and an analog mode, the apparatus comprising:
 (a) differential quadrature phase shift keying (DQPSK) means, coupled to the voice signal, for generating a π/4-shifted DQPSK signal in the digital mode, the means comprising:
  an I vector source coupled to an I vector path; and
  a Q vector source coupled to a Q vector path;
 (b) first mixing means having a first input, a second input, and an output, the first input coupled to the I vector path;
 (c) second mixing means having a first input, a second input, and an output, the first input coupled to the Q vector path; and
 (d) offset oscillator means for generating a frequency modulated signal in the analog mode and a carrier frequency in the digital mode, the means having an output coupled to the second input of the first mixing means, and a modulation input;
 (e) switching means having a first input coupled to the voice signal, a second input coupled to ground potential, and an output coupled to the modulation input of the offset oscillator means, the switching means coupling the voice signal to the offset oscillator means in the analog mode and the ground potential to the offset oscillator means in the digital mode;
 (f) phase shifting means having an output and an input, the input coupled to the output of the offset oscillator means and the output coupled to the second input of the second mixing means;
 (g) control means coupled to the first input of the first and the second mixing means, for enabling the analog mode; and
 (h) combining means, having an output, for combining the outputs of the first and second mixing means, the combining means output is an output of the hybrid modulation apparatus.

14. The apparatus of claim 13 wherein the control means is an I and Q vector table that is input to the I and Q vector paths.

15. The apparatus of claim 13 wherein the control means is a DC offset.

16. The apparatus of claim 13 wherein the control means is an offset current.

17. The apparatus of claim 13 wherein the I vector path contains at least one filter and a digital to analog converter.

18. The apparatus of claim 13 wherein the Q vector path contains at least one filter and a digital to analog converter.

19. The apparatus of claim 13 wherein the phase shifting means is a 90° phase shifter.

20. A hybrid modulation apparatus having at least a digital mode and an analog mode, comprising:
 (a) differential quadrature phase shift keying (DQPSK) means for generating a π/4-shifted DQPSK signal in the digital mode, the means comprising:
  an I vector source coupled to an I vector path;
  a Q vector source coupled to a Q vector path;
 (b) first mixing means having a first input, a second input, a third input, a fourth input, and an output, the first input coupled to the I vector path;
 (c) second mixing means having a first input, a second input, a third input, a fourth input, and an output, the first input coupled to the Q vector path; and (d) offset oscillator means for generating a frequency modulated signal in the analog mode and a carrier frequency in the digital mode, the means having an output coupled to the second input of the first mixing means, and a modulation input;

(e) switching means having a first input coupled to the voice signal, a second input coupled to ground potential, and an output coupled to the modulation input of the offset oscillator means, the switching means coupling the voice signal to the offset oscillator means in the analog mode and the ground potential to the offset oscillator means in the digital mode;

(f) phase shifting means having an output and an input, the input coupled to the output of the offset oscillator means and the output coupled to the second input of the second mixing means;

(g) control means coupled to the third and fourth inputs of at least one of the mixing means, for enabling the analog mode; and (h) combining means, having an output, for combining the outputs of the first and second mixing means, the combining means output is an output of the hybrid modulation apparatus.

21. The apparatus of claim 20 wherein the I vector path contains at least one filter and a digital to analog converter.

22. The apparatus of claim 20 wherein the Q vector path contains at least one filter and a digital to analog converter.

23. The apparatus of claim 20 wherein the phase shifting means is a 90° phase shifter.

24. The apparatus of claim 20 wherein the control means is a DC offset.

25. A communications apparatus, comprising:
(a) receiving means; and
(b) transmitting means, comprising:
a hybrid modulation apparatus, with a voice signal input, having at least a digital mode and an analog mode, the hybrid modulation apparatus comprising:
differential quadrature phase shift keying (DQPSK) means, coupled to the voice signal, for generating a $\pi/4$-shifted DQPSK signal in the digital mode, the means comprising:
an I vector source coupled to an I vector path; and
a Q vector source coupled to a Q vector path;
first mixing means having a first input, a second input, and an output, the first input coupled to the I vector path;
second mixing means having a first input, a second input, and an output, the first input coupled to the Q vector path;
offset oscillator means for generating a frequency modulated signal in the analog mode and a carrier frequency in the digital mode, the means having an output coupled to the second input of the first mixing means, and a modulation input;
switching means having a first input coupled to the voice signal, a second input coupled to ground potential, and an output coupled to the modulation input of the offset oscillator means, the switching means coupling the voice signal to the offset oscillator means in the analog mode and the ground potential to the offset oscillator means in the digital mode;
phase shifting means having an input and an output, the input coupled to the output of the offset oscillator means and the output coupled to the second input of the second mixing means;
control means coupled to the first input of the first mixing means, for enabling the analog mode; and
combining means, having an output, for combining the outputs of the first and second mixing means, the combining means output is an output of the hybrid modulation apparatus.

26. A hybrid modulation apparatus, with a voice signal input, having at least two modes of operation, the apparatus comprising:
(a) first modulation means having an I source coupled to an I vector path, and a Q source coupled to a Q vector path;
(b) first mixing means having a first input, a second input, and an output, the first input coupled to the I vector path;
(c) second mixing means having a first input, a second input, and an output, the first input coupled to the Q vector path; and
(d) offset oscillator means for generating a frequency modulated signal in a first mode and a carrier frequency in a second mode, the means having an output coupled to the second input of the first mixing means, and a modulation input;
(e) switching means having a first input coupled to the voice signal, a second input coupled to ground potential, and an output coupled to the modulation input of the offset oscillator means, the switching means coupling the voice signal to the offset oscillator means in the first mode and the ground potential to the offset oscillator means in the second mode;
(f) phase shifting means having an output and an input, the input coupled to the output of the offset oscillator means and the output coupled to the second input of the second mixing means;
(g) control means coupled to the first input of the first and the second mixing means, for enabling the analog mode; and
(h) combining means, having an output, for combining the outputs of the first and second mixing means, the combining means output is an output of the hybrid modulation apparatus.

* * * * *